May 19, 1964 D. TATUM 3,133,398
ELASTIC CUTTING ELEMENT FOR A LAWN MOWER
Filed Oct. 17, 1960
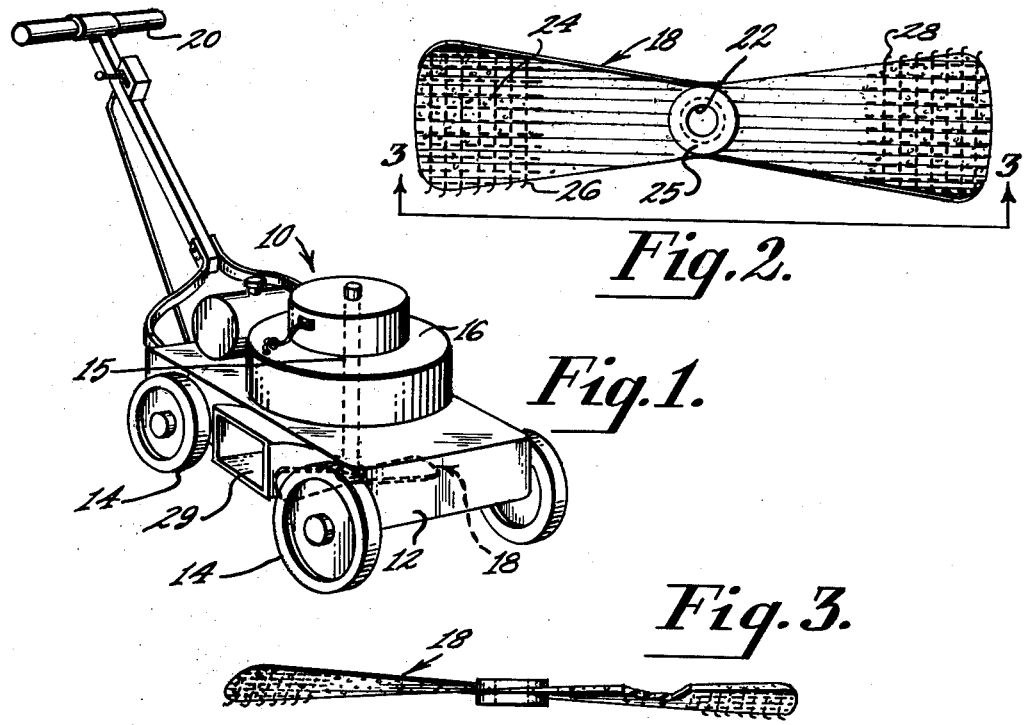
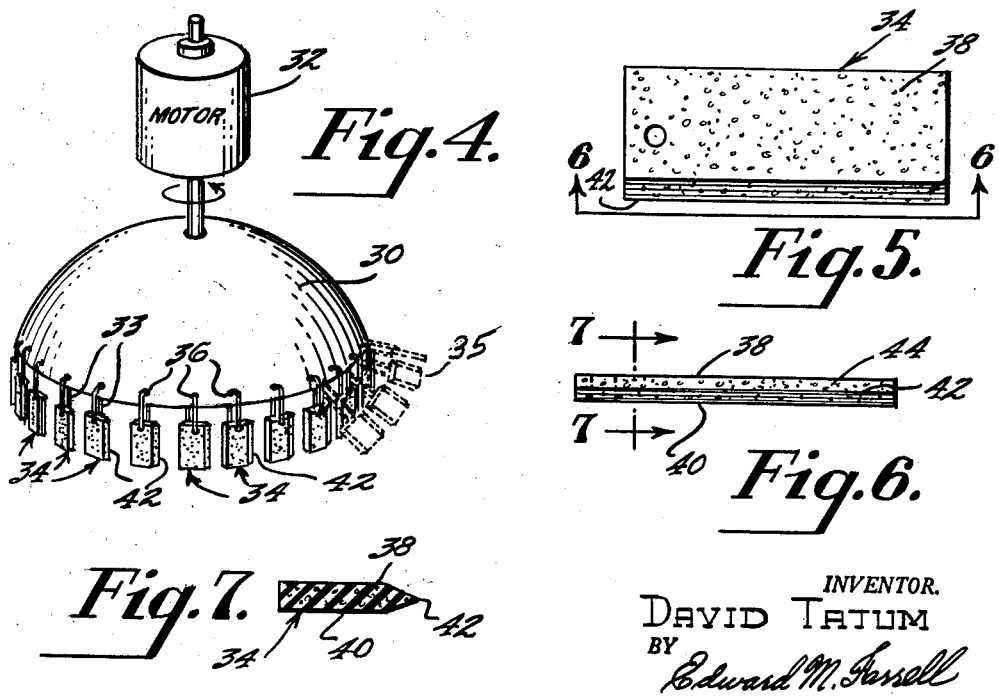
INVENTOR.
DAVID TATUM
BY Edward M. Farrell
ATTORNEY.

United States Patent Office 3,133,398
Patented May 19, 1964

3,133,398
ELASTIC CUTTING ELEMENT FOR A LAWN MOWER
David Tatum, 19 Bryn Mawr Ave., Bala-Cynwyd, Pa.
Filed Oct. 17, 1960, Ser. No. 63,124
2 Claims. (Cl. 56—25.4)

This invention relates to cutting instruments, and more particularly to cutting instruments for use with lawn mowers.

Power driven rotary lawn mowers presently in use generally involve a gasoline or electric powered motor for rotating a cutting blade made of metal such as steel. Such lawn mowers, while capable of performing a satisfactory job in cutting grass, often prove dangerous to operate.

It is well known that many personal injuries result from the use of power driven lawn mowers. Some such injuries, for example, have been caused by an operator accidentally coming in contact with the metal cutting blade while the blade is being rotated at a high speed. This could happen, for example, if the lawn mower is on a hill and accidentally rolls down over the foot of the operator.

Other personal injuries result from the high speed rotating cutting blade imparting dangerous momentum to loose lying stones and other debris on a lawn. Contact by the rotating blade in the latter case often causes stones to be thrown into the air and strike the operator or other persons and property close by. Most of the aforementioned types of personal injuries and propery damage may be attributed primarily to the cutting blade.

Another problem often associated with power driven lawn mowers is that the metal cutting blade often encounters relatively large solid obstructions which cause blade damage. This problem is especially evident when hilly and stony surfaces are being mowed. These solid obstructions, which may be a large rock, for example, often cause the cutting blade to break or to be bent beyond repair. In any case, the cutting edge of the blade, if not broken, becomes dull and must be resharpened. Even stones and small solid obstructions tend to dull the metal cutting edges of blades used conventionally in lawn mowers. When the cutting edge of the blade becomes too dull, it must generally be removed from the main assembly for either sharpening or replacement. Constant removal of the cutting blade is not only time consuming but is often difficult to attain.

Another disadvantage often found in power driven lawn mowers is the relatively heavy weight of the mower blades and the large amount of motor torque required to drive the cutting blades.

It is an object of this invention to provide an improved lawn mower in which the likelihood of personal injury is minimized.

It is still a further object of this invention to provide a novel type cutting blade for a lawn mower which is not susceptible to damage resulting from contact with solid obstructions during operation.

It is still a further object of this invention to provide an improved power lawn mower in which the weight of the mower blade and the motor torque required to drive a cutting blade are minimized.

In accordance with the present invention, a power driven lawn mower is provided. A cutting blade, adapted to be driven, is attached to the main assembly of the mower. The cutting blade is composed of a material of sufficient stiffness to perform a cutting operation and of sufficient pliability to be bent when solid obstructions are encountered.

Other objects and advantages of the present invention will be apparent and suggest themselves to those skilled in the art, from a reading of the following specification and claims in connection with the accompanying drawing, in which:

FIGURE 1 illustrates one form of a power driven rotary type lawn mower which may be used in accordance with the present invention;

FIGURE 2 is an enlarged view of one form of a cutting blade, in accordance with the present invention;

FIGURE 3 is a view of the cutting blade, partly in cross section, taken along lines 3—3 of FIGURE 2;

FIGURE 4 illustrates drive and cutting portions of another form of lawn mower in accordance with the present invention;

FIGURE 5 is an enlarged plane view of one of the cutting blades incorporated into the lawn mower illustrated in FIGURE 4;

FIGURE 6 is a side view of the cutting blade taken along lines 6—6 of FIGURE 5, and FIGURE 7 is a view of the cutting blade in cross section, taken along lines 7—7 of FIGURE 6.

Referring particularly to FIGURE 1, a lawn mower 10 includes a main body 12 having wheels 14 suitably attached thereto. A motor 16, which may be of the gasoline powered type, is suitably mounted to the main body 12. The motor 16 may be provided with a shaft 15 adapted to receive a cutting element or blade 18. Rotation of the shaft by the motor causes the blade 18 to be rotated during a cutting operation. A handle 20 is provided to permit an operator to push the lawn mower. Except for the cutting blade 18, to be described in greater detail, the lawn mower 10 may be of the conventional type and may include a wide variety of different forms.

As is evident, when the lawn mower 10 is pushed by an operator while the cutting blade 18 is rotated at a high speed by the motor 16, excessively long grass over which the mower is moved will be sheared or cut. One form of cutting blade 18, which may be suitably mounted to the shaft 15 of the motor 16 for rotation, is more clearly illustrated in FIGURES 2 and 3.

Referring to FIGURES 2 and 3, the cutting blade 18 comprises an elongated strip suitably shaped to perform a cutting operation. The blade 18 includes a centrally disposed aperture 22 suitably dimensioned to receive the shaft 15 of the motor 16. The blade 18 is composed chiefly of a resilient or pliable material, such as rubber. The rubber, or other similar type material, in the particular embodiment illustrated, includes a steel gauge or wire screen 24. The screen 24, which may include a number of longitudinal wires extending along the length of the cutting blades, is sufficiently thin so that the main body of the cutting blade, which comprises the rubber material, maintains its resiliency.

The screen 24 further includes a plurality of wires disposed within the rubber material in a direction substantially perpendicular to the longitudinal wires to form the wire screen type of configuration.

The edges 26 of the wires comprising the screen 24, embedded in the cutting blade 18, may extend slightly beyond the rubber material with the ends being bent over the edges of the rubber material.

The cutting blade 18 is suitably shaped into a propeller like shape to provide a suction to cause long grass to stand erect during a cutting operation in which the blade is rotated at a high speed.

The size of the aperture 22 may be approximately one and one quarter inches in diameter to fit over the shaft of the motor. A ring member 25, which may be made of nylon or other hard wearing material is suitably attached to the blade 18. The width of the blade 18 through the center of the aperture 22 may be approximately three and one-quarter inches.

In an actual embodiment of the present invention which was built and operated successfully, the number of longitudinal wires passing through the rubber material numbered approximately forty-eight. The embedded cutting wires at the ends of the rubber blade were exposed to project approximately one-eigth of an inch from leading edges of the blade ends. The leading edges 26 and 28 may be sharpened in any desired manner to permit cutting. The degree of sharpening necesary will of course depend upon the speed at which the blade operates. The leading edges 26 and 28 of the blade 18 were twisted downward so that the bottom side of the ends were approximately three-eighths of an inch lower than the bottom side of the blade as a whole. The actual cutting surfaces of the blade was approximately one and three-quarter inches in length.

The shape of the blade 18 must of course be such as to perform satisfactorily aerodynamically so that the cut grass will be forced upward through the blade and suitably disposed of, for example, through an opening 29.

Various mechanical details relating to the lawn mower 10 are not shown or described in detail, since such details are well known to those skilled in the art and are not directly related to the present invention.

The rubber blade 18 and its use to shear grass by impact and by tearing, while not having sufficient force to impart dangerous momentum to loose lying stones and other debris which may be on a lawn, is one of the main features of the present invention. Rubber, as is well known, is a resilient shock absorbing composition. When a massive obstruction is encountered during a mowing operation, the nature of the impact forces imparted to any such massive obstruction is changed and diminished so that the blade neither fractures nor severely damages the obstruction.

The nature of the forces imparted to a massive obstruction is changed because of the reaction of the rubber material comprising the blade 18. Since every force has an equal and opposite force, the maximum impact that the blade 18 is capable of delivering to a massive obstruction is reduced by the deflection and distortion of the blade. Impact being a time dependent phenomenon, any increase in the period of time during which momentum is transferred decreases the magnitude of the impact and the nature of the reaction within the struck body. The period of time that the produce requires to distort or deflect prevents forces arising sufficiently for penetration into or fracture of massive obstructions.

While the resilient material comprising the blade 18 has been described as being rubber, various other elastomer materials which may be formed into semirigid (semifluid) shapes may be used.

In order to be sure that the rubber blade will cut grass, small solid particles, instead of the strands of wires in screen 24 illustrated in FIGURES 2 and 3, may be embedded into the rubber material. This material may be embedded while the rubber blade is being molded, for example. Such small particles, for example, may comprise sand, powdered glass or certain gelling agents.

The cutting edge of the blade 18, instead of having bent over wire, over its edges, may include small solid particles embedded in the cutting edge of the blade. Such small particles, for example, may include such material as crushed stones, ceramic bodies or metal chips.

Referring particularly to FIGURE 4, another form of the present invention includes a bell type member 30 adapted to be rotated by a motor 32. Various other elements associated with the mower, such as the handle means to permit pushing and details of the main assembly, are not illustrated for purposes of clarity. These details are obvious to those skilled in the art and not directly related to the present invention and many such details are already illustrated in FIGURE 1. The bell type member 30, which may also be described as a cup or bowl shaped structure, may be made of rubber or other semi-rigid material. The bottom periphery of the member 30 includes a plurality of apertures 36 adapted to receive a plurality of clip or wire elements 33. A plurality of cutting elements 34 include apertures and adapted to receive the clip elements 33. The blades 34 are suitably attached to the clip elements 33 with the blades then being in downward positions when the member 30 is stationary. During rotation of the member 30, the cutting elements 34 are free to fly in positions illustrated by the elements 35 shown in dotted lines. The flat portion of the cutting elements 34 are parallel to the ground during operation with one of the sharpened edges 42 performing the cutting. FIGURES 5, 6 and 7 illustrate one of the cutting elements 34 in greater detail.

The cutting element 34 comprises an elastomer material 38, such as rubber for example, into which small particles of dilatancy causing material, such as particles of powdered glass 40, are embedded during a molding process of the element. The edge 42 of the cutting element 34 comes to a point to provide a cutting edge. If desired, the edge 42 may include small amount of particles, such as crushed stone, to give an additional dilatancy to the cutting element.

When the bell type element 30 (FIGURE 4) is rotated, centrifugal force will cause the clips or wires 33 to splay outward from the bottom. A continuous wire, tape, or cord fibre may be embedded in the edge of the bell element 30 to prevent stretch.

A rubber dome shaped so called "St. Catherine" wheel may be employed in place of the element 30. In this case, the cutting element 34 would still be suspended from the rim of a wheel. However, the weight and height of the wheel could be reduced.

The wheel rim of the bell type member 30 could have rubber fan blades molded integrally to increase the air draft and wind to cause the grass to stand erect and to be blown away after being cut. These rubber blades could be non cutting and rotate in a plane just above the plane transversed by the cutting members. Such last means are not illustrated in the drawing.

Another advantage of the arrangement illustrated in FIGURE 4 is that the cutting elements are easily replaced when worn. Furthermore, the mass of the cutting elements would be small compared to the entire rotating mass so that loss of one cutting member would not seriously disbalance the rotating system.

The safety features of the present invention are apparent. A person accidentally contacting the cutting blade while it is rotating at a high speed, will cause the blade to bend. Serious injury, which may result in serious cuts or amputation, to the person making such contact is thereby avoided. Also, injury resulting from flying stones is minimized since a rubber cutting blade is resilient and will be bent whenever a solid obstruction is encountered.

A rubber blade has the additional advantage in that it may be readily sharpened without the necessity of removing the blade from the main assembly. This may be accomplished by an ordinary file by merely roughing up the cutting edges.

What is claimed is:

1. A lawn mower for cutting grass comprising a main assembly, a shaft element, a motor for driving said shaft element, a cutting element attached to said shaft element adapted to be rotated in a substantially horizontal plane when said shaft is driven by said motor, said cutting element being disposed to cut grass on a surface over which said lawn mower is moved, and said cutting element having a cutting edge composed of an elastic material having a metal screen type element embedded therein.

2. A lawn mower for cutting grass comprising a main assembly, a shaft element, a motor for driving said shaft element, a cutting element attached to said shaft element adapted to be rotated in a substantially horizontal plane when said shaft is driven by said motor, said cutting element being disposed to cut grass on a surface over which said lawn mower is moved, and said cutting element having a cutting edge composed of an elastic material having inelastic particles therein.

References Cited in the file of this patent
UNITED STATES PATENTS

| | | |
|---|---|---|
| 2,506,054 | Agee et al. | May 2, 1950 |
| 2,837,887 | Hansen | June 10, 1958 |
| 2,862,717 | Ronning | Dec. 2, 1958 |
| 2,869,311 | Beeston | Jan. 20, 1959 |